United States Patent
Poulos et al.

(10) Patent No.: US 9,367,960 B2
(45) Date of Patent: Jun. 14, 2016

(54) BODY-LOCKED PLACEMENT OF AUGMENTED REALITY OBJECTS

(71) Applicant: MICROSOFT TECHNOLOGY LICENSING, LLC, Redmond, WA (US)

(72) Inventors: Adam G. Poulos, Sammamish, WA (US); Tony Ambrus, Seattle, WA (US); Jeffrey Cole, Seattle, WA (US); Ian Douglas McIntyre, Redmond, WA (US); Stephen Latta, Seattle, WA (US); Peter Tobias Kinnebrew, Seattle, WA (US); Nicholas Kamuda, Seattle, WA (US); Robert Pengelly, Seattle, WA (US); Jeffrey C. Fong, Seattle, WA (US); Aaron Woo, Bellevue, WA (US); Udiyan I. Padmanahan, Bellevue, WA (US); Andrew Wyman MacDonald, Seattle, WA (US); Olivia M. Janik, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 13/900,416

(22) Filed: May 22, 2013

(65) Prior Publication Data

US 2014/0347390 A1 Nov. 27, 2014

(51) Int. Cl.
G06T 19/00 (2011.01)
G06F 3/01 (2006.01)
G06F 3/038 (2013.01)
G02B 27/01 (2006.01)

(52) U.S. Cl.
CPC .......... *G06T 19/006* (2013.01); *G02B 27/017* (2013.01); *G06F 3/011* (2013.01); *G06F 3/012* (2013.01); *G06F 3/038* (2013.01); *G02B 2027/014* (2013.01); *G02B 2027/0187* (2013.01)

(58) Field of Classification Search
None
See application file for complete search history.

(56) References Cited

U.S. PATENT DOCUMENTS 6,637,883 B1 * 10/2003 Tengshe et al. ............... 351/210
8,223,024 B1    7/2012 Petrou
(Continued)

FOREIGN PATENT DOCUMENTS

WO    2010092524 A2    8/2010

OTHER PUBLICATIONS

Bruder et al (Enhancing Presence in Head-mounted Display Environments by Visual Body Feedback Using Head-mounted Cameras, 2009, International Conference on CyberWorlds).*
(Continued)

*Primary Examiner* — Kee M Tung
*Assistant Examiner* — Xin Sheng
(74) *Attorney, Agent, or Firm* — Dan Choi; Judy Yee; Micky Minhas

(57) ABSTRACT

Embodiments are disclosed that relate to placing virtual objects in an augmented reality environment. For example, one disclosed embodiment provides a method comprising receiving sensor data comprising one or more of motion data, location data, and orientation data from one or more sensors located on a head-mounted display device, and based upon the motion data, determining a body-locking direction vector that is based upon an estimated direction in which a body of a user is facing. The method further comprises positioning a displayed virtual object based on the body-locking direction vector.

17 Claims, 8 Drawing Sheets

(56) References Cited

U.S. PATENT DOCUMENTS

| | | | |
|---|---|---|---|
| 2011/0012814 | A1 | 1/2011 | Tanaka |
| 2012/0056800 | A1* | 3/2012 | Williams et al. ............... 345/156 |
| 2012/0212499 | A1* | 8/2012 | Haddick et al. ............... 345/589 |
| 2012/0249797 | A1 | 10/2012 | Haddick et al. |
| 2012/0327116 | A1 | 12/2012 | Liu et al. |

OTHER PUBLICATIONS

Abbate et al (Development of a MEMS based wearable motion capture system, 2009, HSI).*

Polak et al (Head Motion Anticipation for Virtual-Environment Applications Using Kinematics and EMG Energy, 2006, IEEE).*

Pipe et al (Motion Correction with Propeller MRI: Application to Head Motion and Free-Breathing Cardiac Imaging, 1999, Magnetic Resonance in Medicine 42:963-969).*

Bulling, et al., "Multimodal Recognition of Reading Activity in Transit Using Body-Worn Sensors", Retrieved at <<https://www.andreas-bulling.de/fileadmin/docs/bulling12_tap.pdf>>, In Journal of ACM Transactions on Applied Perception, vol. 9, Issue 1, Article 2, Mar. 2012, pp. 21.

Foxlin, Eric., "Head-Tracking Relative to a Moving Vehicle or Simulator Platform Using Differential Inertial Sensors", Retrieved at <<http://citeseerx.ist.psu.edu/viewdoc/download?doi=10.1.1.14.405&rep=rep1&type=pdf>>, In Proceedings of Helmet and Head-Mounted Displays V, SPIE, vol. 4021, Apr. 24, 2000, pp. 12.

Sausman, et al., "Effect of Eye and Body Movement on Augmented Reality in the Manufacturing Domain", Retrieved at <<http://ieeexplore.ieee.org/stamp/stamp.jsp?tp=&arnumber=6402591>>, In IEEE International Symposium on Mixed and Augmented Reality, Nov. 5, 2012, pp. 2.

Jay, et al., "Amplifying Head Movements with Head-Mounted Displays", Retrieved at <<http://aig.cs.man.ac.uk/people/jayc/Presence_Amp.pdf>>, In Journal of Presence: Teleoperators and Virtual Environments, vol. 12, Issue 3, Jun. 1, 2003, pp. 18.

Waller, et al., "Body-Based Senses Enhance Knowledge of Directions in Large-Scale Environments", Retrieved at <<http://pubman.mpdl.mpg.de/pubman/item/escidoc:60316:3/component/escidoc:60317/Waller_2004_bodybased.pdf>>, In Psychonomic Bulletin & Review, vol. 11, Issue 1, Feb. 2004, pp. 7.

ISA European Patent Office, International Search Report & Written Opinion for PCT/US2014/039042, WIPO, Sep. 5, 2014, 17 Pages.

Billinghurst et al., "A Wearable Spatial Conferencing Space", In Digest of Papers, Second International Symposium on Wearable Computers, Oct. 19, 1998, 8 Pages.

Piekarski et al., "Augmented Reality Working Planes: A Foundation for Action and Construction at a Distance", In Proceedings of the Third IEEE and ACM International Symposium on Mixed and Augmented Reality, Nov. 2, 2004, 10 Pages.

Algazi et al., "Motion-Tracked Binaural Sound for Personal Music Players", In Proceedings of the 119th Convention of the Audio Engineering Society, Oct. 7, 2005, 8 Pages.

IPEA European Patent Office, Second Written Opinion Issued in Application No. PCT/US2014/039042, Apr. 13, 2015, WIPO, 10 Pages.

IPEA European Patent Office, International Preliminary Report on Patentability Issued in Application No. PCT/US2014/039042, Aug. 27, 2015, WIPO, 9 pages.

* cited by examiner

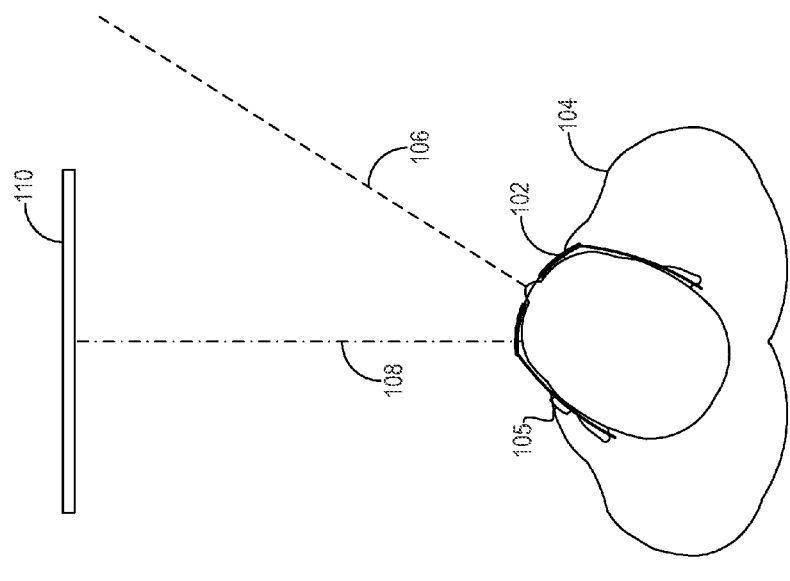
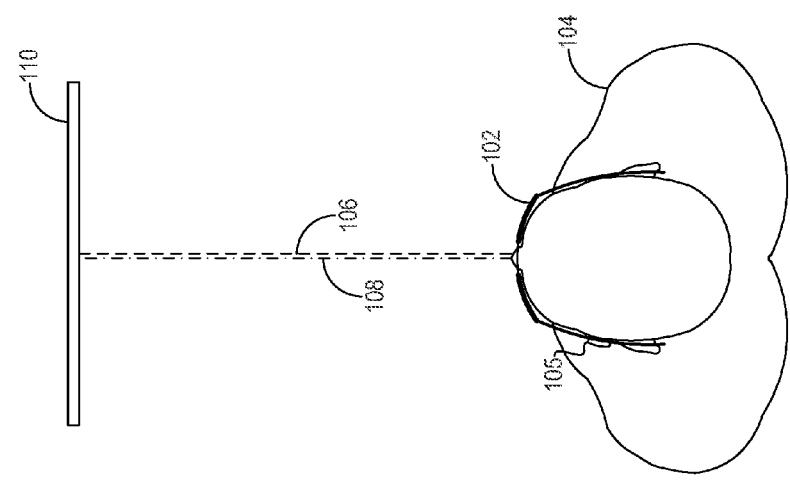

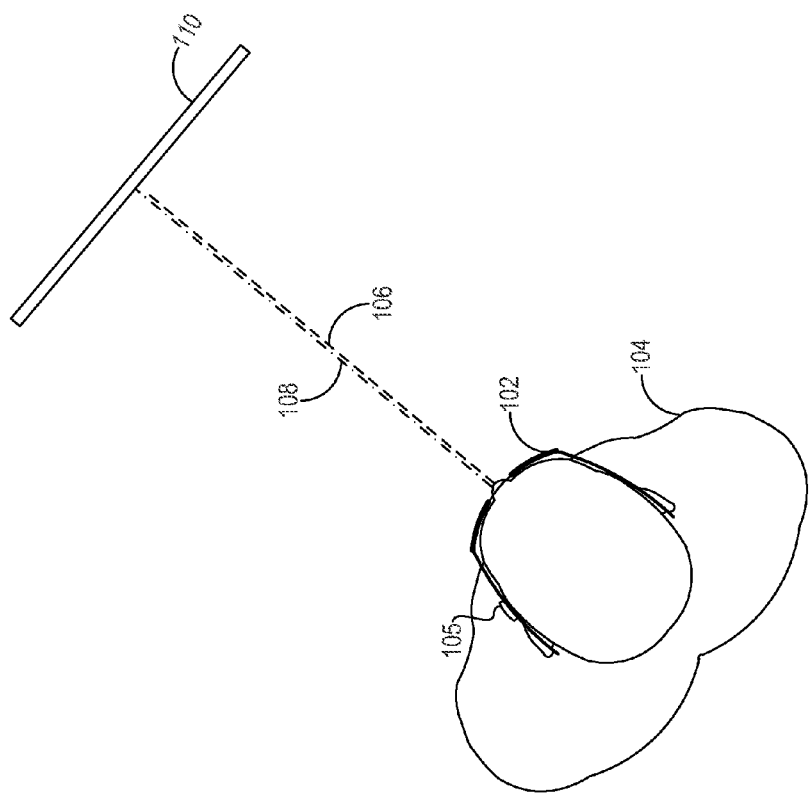
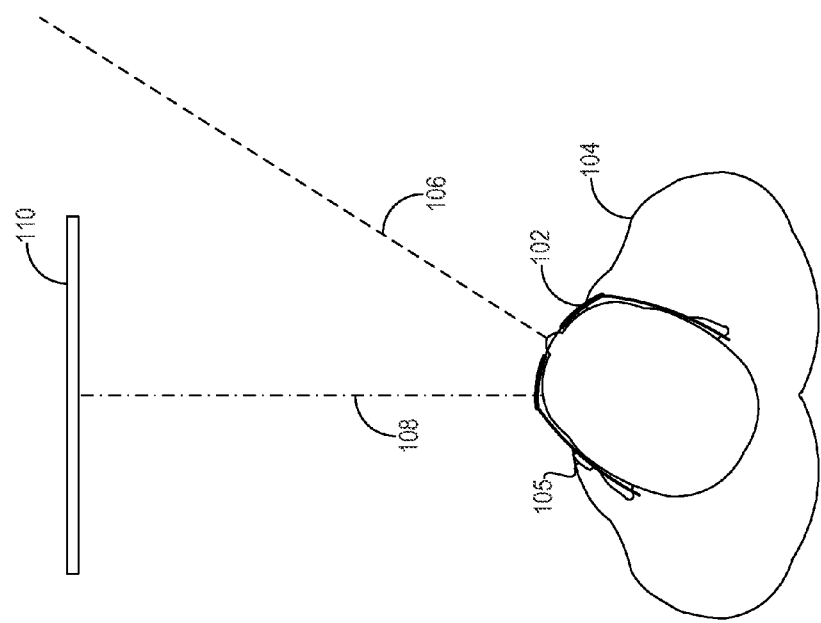

US 9,367,960 B2

BODY-LOCKED PLACEMENT OF AUGMENTED REALITY OBJECTS

BACKGROUND

An augmented reality computing device may display virtual objects overlaid on a view of a real-world environment. Augmented reality computing devices may take various forms, including but not limited to wearable devices such as head-mounted displays. A head-mounted display may comprise a see-through display system that allows virtual objects to be displayed in such a manner that the virtual objects appear to exist within the real-world environment.

SUMMARY

Embodiments are disclosed that relate to positioning virtual objects in an augmented reality environment. For example, one disclosed embodiment provides a method comprising receiving sensor data comprising one or more of motion data, location data, and orientation data from one or more sensors located on a head-mounted display device, and based upon the sensor data, determining a body-locking direction vector that is based upon an estimated direction in which a body of a user is facing. The method further comprises positioning a displayed virtual object based on the body-locking direction vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B schematically show an example positioning of a body-locked virtual object in an augmented reality environment according to an embodiment of the present disclosure.

FIGS. 2A and 2B show an example repositioning of a body-locked virtual object based on an updated body-locking direction vector according to an embodiment of the present disclosure.

DETAILED DESCRIPTION

Figure 3:
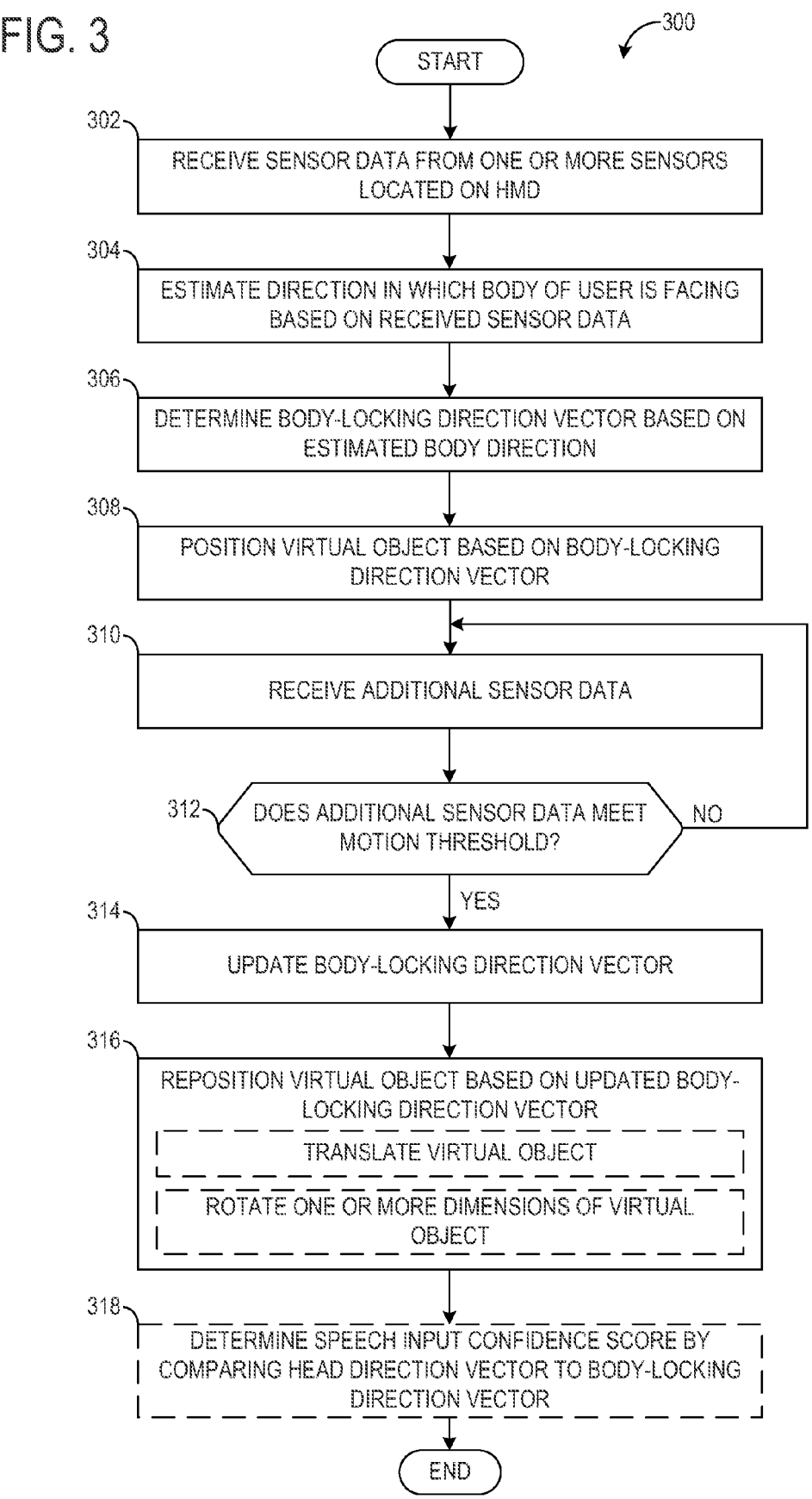
FIG. 3 shows a flow diagram depicting an embodiment of a method of positioning body-locked virtual objects in an augmented reality environment.

A variety of approaches may be used to place virtual objects in real-world environments in an augmented reality image. For example, in a world-locking approach, a virtual object may be locked to a reference location in the real-world environment, such that the location of the virtual object remains constant relative to the real-world environment regardless of the position or angle from which it is viewed. World-locking may be used to make the placement of a virtual object resemble the placement of a real, physical object.

In a head-locking approach, a virtual object may be locked to the position and direction of a user's head such that the location of the virtual object in a user's field of view appears fixed regardless of a direction in which the user faces. Head-locking may be used, for example, to display persistent user interface icons in the user's field of view, such as a holographic clock displaying the current time.

Such approaches, however, may be incapable of delivering certain user experiences. For example, with an object such as a virtual television, a user of a head-mounted display device may wish to keep the object persistently in view, but not necessarily have it follow all head movements. Further, if the position of a cursor in a user interface is controlled with such head movements, the cursor may be unable to reach an object desired for selection, as the object may move in the same direction and amount as the cursor, as head movements are interpreted.

Accordingly, embodiments are disclosed herein that relate to placement of virtual objects relative to a body of a user in an augmented reality environment. Briefly, the disclosed embodiments may utilize sensor data to determine a body-locking direction vector based, for example, upon an estimated direction in which a body of a user is facing. Virtual objects may then be positioned based on the body-locking direction vector.

FIGS. 1A and 1B schematically show an embodiment of an augmented reality environment 100 in which virtual objects may be positioned and viewed via a head-mounted display device (HMD) 102, shown worn on a head of a user 104. More specifically, FIGS. 1A and 1B illustrate a "body-locking" approach in which virtual objects are fixed relative to a determined body locking vector. In these examples, virtual objects are spatially positioned based on an estimated direction of a body of user 104. Although examples are provided in which virtual objects are spatially positioned based upon an estimated direction of a torso of user 104, any limb or region of the body (e.g., head, arms, etc.) of user 104 may be used to position virtual objects. It will be appreciated that "positioning" as used herein may refer to two-dimensional and three-dimensional positioning of virtual objects. For example, virtual objects (e.g., user interface icons) may be two-dimensionally positioned to appear on a flat surface in a field of view of user 104, while three-dimensionally positioned virtual objects may appear to have depth in the field of view.

A sensor system 105 located on HMD 102 may output data that may be used to track the location and orientation of the head of user 104. Sensor system 105 may comprise, for example, an inertial measurement unit (IMU), and may include one or more accelerometers, gyroscopes, magnetometers, etc. Sensor system 105 may be configured to output sensor data including motion data corresponding to translational and/or rotational user motion, location data representative of a user's spatial location, and orientation data representative of a user's spatial orientation. As described in further detail below with reference to FIG. 8, HMD 102 may further include a logic subsystem configured to process and interpret data received from sensor system 105, among other data.

As seen in FIGS. 1A and 1B, HMD 102 has determined a head direction vector (HDV) 106 based on sensor data received from sensor system 105. In this example, HDV 106 represents the estimated direction in which the head of user 104 is facing. HDV 106 is illustrated as extending from a center of the head of user 104, but may extend from any other suitable location on the user's head.

HMD 102 also has determined a body-locking direction vector (BLDV) 108 based on an estimated direction in which the body of user 104 is facing as determined via sensor data. With HDV 106 and BLDV 108 determined, HMD has accordingly positioned a virtual television (TV) 110 in the field of view of user 104. In FIG. 1A, vectors HDV 106 and BLDV 108 have a same direction, though are shown as slightly offset from each other for clarity.

FIG. 1B illustrates a response of the display of TV 110 to an example head motion. In particular, the head of user 104 has been rotated in a clockwise direction. Accordingly, HDV 106 is updated to reflect the changed head direction of user 104. However, BLDV 108 is not updated, based upon a determination that the sensor data recording this head rotation more likely corresponds to head motion rather than body motion. As such, the location of holographic TV 110 remains unchanged from the state of FIG. 1A.

On the other hand, the BLDV 108 may be updated and body-locked virtual objects repositioned if it is determined that the sensor data corresponds to body motion, rather than just a head motion. FIGS. 2A and 2B illustrate an example repositioning of virtual objects that are body-locked to user 104. First, FIG. 2A shows the head of user 104 rotated in a clockwise direction and HDV 106 directed according to the determined head direction. Holographic TV 110 remains positioned according to BLDV 108, which was not updated in response to this head rotation.

Next, in FIG. 2B, the head of user 104 has rotated further and thus met a rotational threshold, prompting update of BLDV 108. Accordingly, holographic TV 110 is repositioned in the field of view of user 104 based on the updated BLDV 108.

The rotational threshold is an example of a heuristic that may be applied to head motion data based upon human anatomy. For example, the rotational threshold may be selected to correspond to a rotational orientation of the head of user 104 which is unlikely to occur by neck movement alone. The rotational threshold may be pre-selected and set during development/manufacturing, or may be set via user calibration or other user action. Other heuristics may be similarly employed, as described in more detail below.

In this way, the body-locked positioning of virtual objects on an augmented reality display device may allow persistent virtual objects to remain in a user's field of view or otherwise at a consistent location relative to the body of the user, yet also allow the user to interact with the persistent objects via head gestures. Moreover, a body-locking approach may be implemented with motion sensors alone. This may allow the body-locked positioning of objects to be implemented without other sensors, such as inward or outward facing image sensors, which may help to decrease a cost, complexity, and power consumption of HMD 102.

FIG. 3 shows a flow diagram depicting an embodiment of a method 300 of positioning body-locked virtual objects in an augmented reality environment. Method 300 may be executed on HMD 102 of FIG. 1 and/or on any other suitable augmented reality computing device.

At 302, method 300 comprises receiving sensor data from one or more sensors located on a head-mounted display, and at 304, estimating a direction in which a body of a user is facing based on the sensor data. An estimated body direction of a user may initially coincide with an estimated direction in which a head of the user is facing upon initialization of the HMD. Such a condition is represented in FIG. 1A, for example.

At 306, method 300 comprises determining a BLDV based on the estimated body direction. The BLDV may have a same direction as the determined body direction, or may have any other suitable relationship to the determined body direction.

At 308, method 300 comprises positioning a virtual object based on the BLDV. As shown in FIG. 1A, for example, holographic TV 110 is positioned in the field of view of user 104 based on BLDV 108. In this example, holographic TV 110 is positioned such that the center of the major surface (e.g., display screen) of the holographic TV intersects BLDV 108. It will be appreciated, however, that a virtual object may be positioned in any suitable location and/or orientation relative to a determined BLDV, and that such location and/or orientation may be a property or policy associated with the virtual object. Further, virtual objects in some scenarios may be positioned relative to a determined BLDV but outside the field of view of a user (e.g., behind the user).

At 310, method 300 comprises receiving additional sensor data from the sensors. The additional sensor data may be received at any suitable frequency, for example at an update interval of an application being executed on the HMD or other computing device. As a non-limiting example, sensor data may be received 30 times per second, which may provide for smooth apparent motion tracking.

At 312 it is determined whether the additional sensor data received at 310 meets a motion threshold. The threshold may correspond, for example, to a heuristic regarding whether it is likely that the additional sensor data corresponds to head motion or body motion. The motion threshold may be a rotational threshold corresponding to a rotational orientation of a head of the user, a translational threshold, and/or any other suitable threshold.

If it is determined at 312 that the additional sensor data received at 310 does not meet the motion threshold, then method 300 returns to 310. In some embodiments, the additional sensor data received at 310 may be accumulated and the resulting cumulative total compared to the motion threshold.

If instead it is determined at 312 that the additional sensor data does meet the motion threshold (YES), method 300 proceeds to 314. At 314, method 300 comprises updating the BLDV, and at 316, repositioning the virtual object based on the updated BLDV. Any suitable method may be used to reposition virtual objects based on an updated BLDV. As a non-limiting example, a virtual object may be repositioned one meter in front of a user by first obtaining an HDV based on sensor data received from the sensors, determining an offset (e.g., vertical offset) corresponding to an estimated body position of the user, and adding the offset to the HDV to form an offset HDV. Then, the magnitude of a BLDV, determined as described above, may be scaled to one meter (for example), and the BLDV may be added to the offset HDV to form a third resultant vector. The virtual object may then be repositioned based on the third resultant vector.

In some examples, virtual objects may be repositioned immediately following determination of an updated BLDV. In other examples, repositioning of virtual objects may be performed in a more smooth and gradual manner, and may be carried out in an object-specific way. For example, ghost-like objects may be repositioned upon determination of an updated BLDV by reappearing in an updated field of view in a cloud of smoke. Further, in another example, virtual objects may be repositioned by entering the updated field of view with a speed proportional to the difference between the updated BLDV and the previous BLDV.

As indicated at 316 in FIG. 3, repositioning the virtual object may include translating the virtual object in the user's field of view and/or rotating one or more dimensions of the virtual object. In some approaches, a virtual object may be positioned or repositioned such that the object is oriented based upon a feature in the real-world environment, instead of a position of the user. For example, a holographic television may be positioned such that the holographic television is parallel to a real, physical wall in the environment, instead of normal to the BLDV.

As another non-limiting example, information representative of gravity (e.g., a gravity vector made available by an accelerometer) may be utilized to maintain an upward orientation of a holographic television from the user's perspective. Still further, one or more dimensions of a virtual object may be rotated to automatically direct a selected aspect of a virtual object toward the user's body. Permitted rotational and translational motion of objects may be properties or policies associated with selected virtual objects and/or virtual object types.

Continuing with FIG. 3, at 318, in some embodiments, sensor data may be used to determine a confidence score associated with a speech input. Such a confidence score may be determined, for example, by comparing a HDV to a BLDV. Higher angles between the HDV and BLDV may indicate that a user is not currently looking at a body-locked user interface placed near the BLDV, and therefore that the speech is less likely to be intended as a speech input. Thus, higher angles may result in lower confidence scores in some examples.

In some embodiments, discrete angular zones may correspond to discrete, different confidence levels that result in the performance of different actions. For example, in one specific example, if it is determined that the angle between the HDV and the BLDV is between 0° and 30°, then a speech input command may be performed without further confirmation. If the angle is between 30° and 60°, execution of the speech input may require additional confirmation (e.g., an additional speech input). If the angle is 60° or greater, the speech input may be ignored. In other embodiments, a more continuous approach may be used.

The determination of a confidence score may utilize any other suitable information. For example, the confidence score determination may utilize a time duration for which the HDV associated with the user intersects an object (e.g., a readable document such as a virtual newspaper), such that the confidence score increases as a function of increasing time. More generally, it may be considered that the longer the user is engaged with an object, measured in the above example via HDV-object intersection, the more likely speech input is intended for an object or aspect of the environment.

Figure 4:
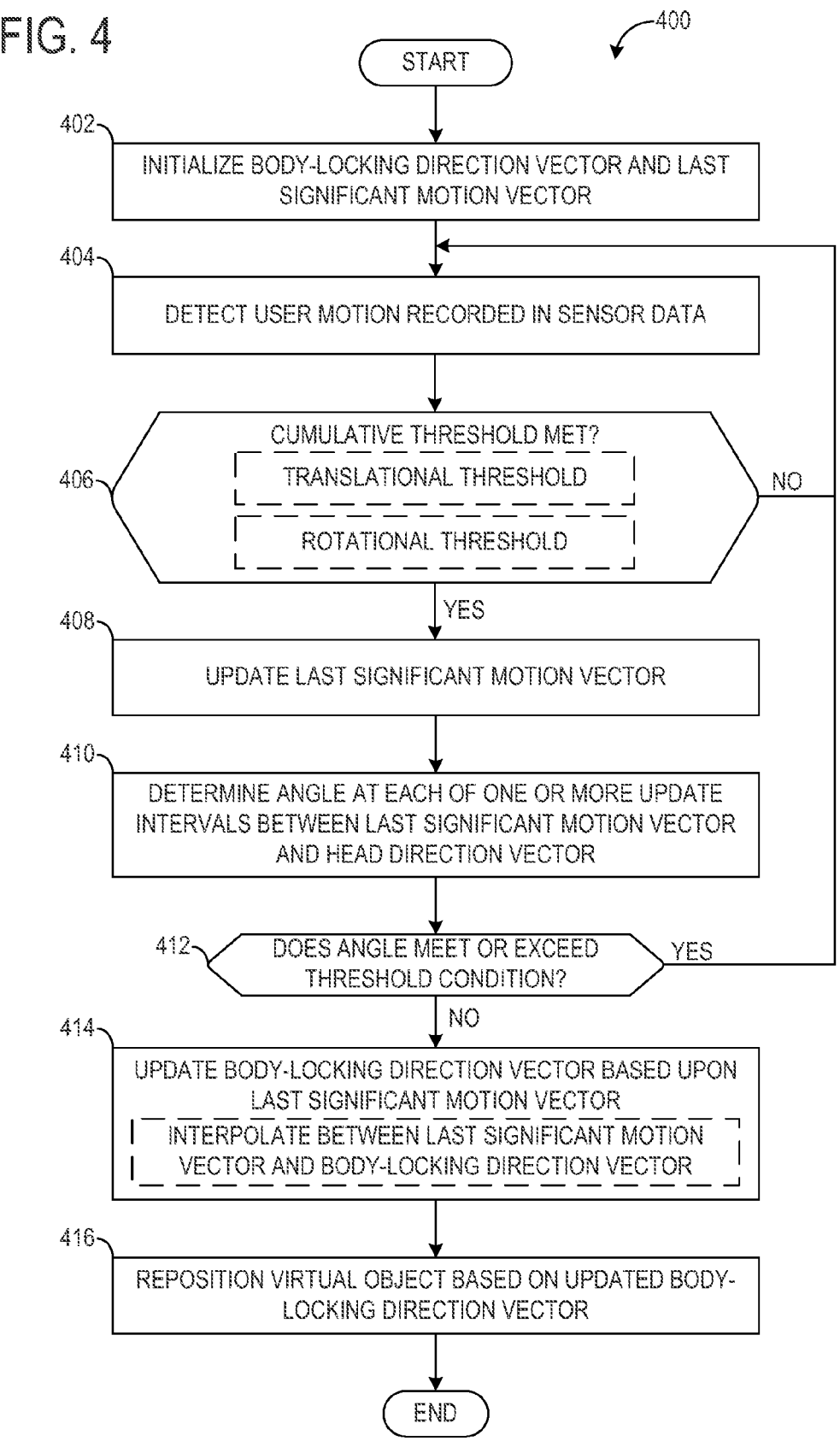
FIG. 4 shows a flow diagram depicting an embodiment of a method of positioning body-locked virtual objects in an augmented reality environment using a last significant motion vector.

FIG. 4 shows a flow diagram depicting another embodiment of a method 400 of positioning body-locked virtual objects in an augmented reality environment. The embodiment of FIG. 4 tracks an additional vector, herein referred to as a last significant motion vector (LSMV). As with method 300, method 400 may be executed on any suitable device configured to present an augmented reality environment, including but not limited to a HMD.

At 402, method 400 comprises initializing a BLDV and a LSMV, for example, during initialization of the HMD or other computing device. The LSMV may be used to track translational motion of a user and to update the BLDV, as described below.

At 404, user motion recorded in sensor data is detected, wherein the user motion may correspond to translational and/or rotational motion. At 406, it is determined whether a cumulative motion threshold has been met. The threshold may be a translational threshold, and may correspond to a real-world distance traversed by the user (e.g., one meter).

If it is determined at 406 that the cumulative threshold has not been met, method 400 returns to 404, where user motion is again detected based on received sensor data. As such, user motion may be accumulated while the cumulate threshold is not met. Thus, translational user motion corresponding substantially to a single action (e.g., a series of successive strides in a forward direction that meet the threshold) and translational user motion corresponding to a series of temporally separated steps may both meet the threshold in various instances.

If it is determined that the cumulative threshold has been met, method 400 proceeds to 408, where the LSMV is updated. The LSMV may be given any suitable updated values. For example, the updated LSMV may comprise a direction corresponding to the direction of the determined translation of the user's body based upon the assumption that the user's body faces in a direction in which the user moves the threshold distance.

Continuing, at 410, method 400 comprises determining an angle between the LSMV and HDV at each of one or more update intervals. The HDV may be determined from HMD sensor data, and the one or more update intervals may correspond to update intervals of an application undergoing execution on the HMD or other computing device, as described above.

At 412, method 400 comprises determining whether the angle meets a threshold condition (e.g. meets or exceeds a threshold angle, or any other suitable threshold condition). If it is determined that the angle does meet the threshold condition, method 400 returns to 404 where further user motion is detected. If instead it is determined that the angle does not meet the threshold condition, method 400 proceeds to 414 where the BLDV is updated based upon the LSMV. Thus, if the user is undergoing a threshold amount of translational motion and is looking in a direction substantially similar to the direction of translational motion, it may be determined that the user's body is likely moving along that direction (e.g. the user is walking), and thus the BLDV (e.g. body direction) may be set to, or otherwise updated with, the LSMV. On the other hand, if the angle between translational motion and head direction meets the threshold condition (e.g., angle), the likely direction in which the user's body is directed may be less clear. As such, the BLDV is not updated.

Updating the BLDV based upon the LSMV at 414 may optionally include interpolating a direction for the updated BLDV that is between the LSMV and the prior BLDV. This may help to smooth the motion of body locked virtual objects as the user moves over time. Method 400 further comprises, at 416, repositioning the virtual object based on the updated BLDV.

Figure 5:
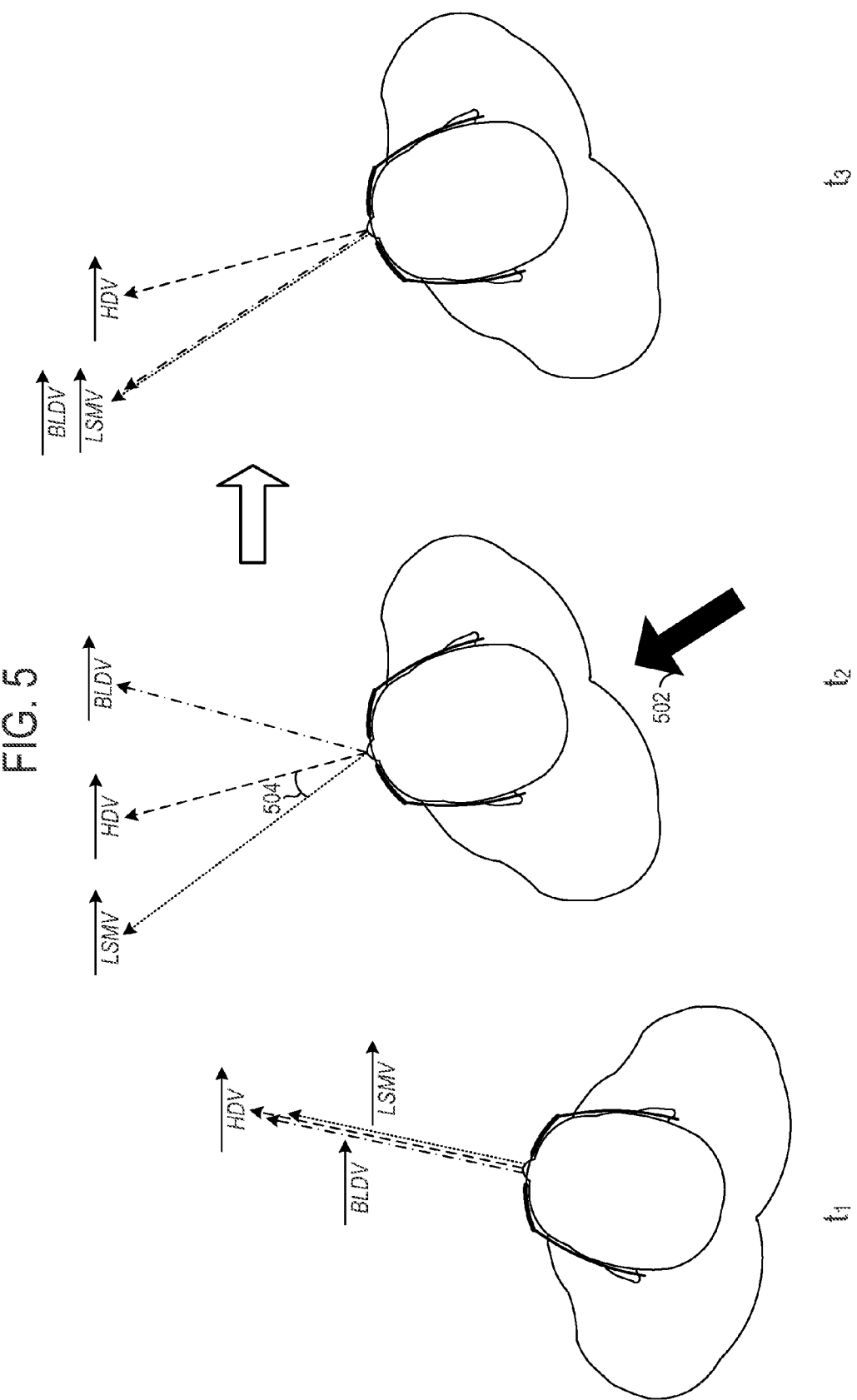
FIG. 5 schematically shows an example vector determination according to the method of FIG. 4.

FIG. 5 illustrates an example vector determination according to method 400, and shows an HDV, BLDV, and a LSMV associated with the user at a time $t_1$ after initialization of the vectors. At time $t_2$, user 104 has undergone translational motion in a direction represented by arrow 502 and in an amount meeting a translational motion threshold (e.g., the cumulative threshold evaluated at 406 of method 400), along with some rotational motion. The LSMV has accordingly been updated to point along the direction of translation represented by arrow 502. In this example, the head direction of user 104 is slightly rotated in a clockwise direction. Accordingly, the HDV shown in this example reflects this rotational motion of the head compared to the LSMV, which reflects the translational motion but not the rotational motion.

At $t_2$, the BLDV thus far retains its prior value (e.g., direction and magnitude) shown in FIG. 1. Next an angle 504 between HDV and LSMV is determined and compared to a threshold. Here, angle 504 does not meet the threshold. As such, the BLDV is updated at a time $t_3$. In the depicted example, BLDV is updated to match the direction of the LSMV. In other embodiments, the BLDV may be updated to match a direction interpolated between the LSMV and prior BLDV.

Figure 6:
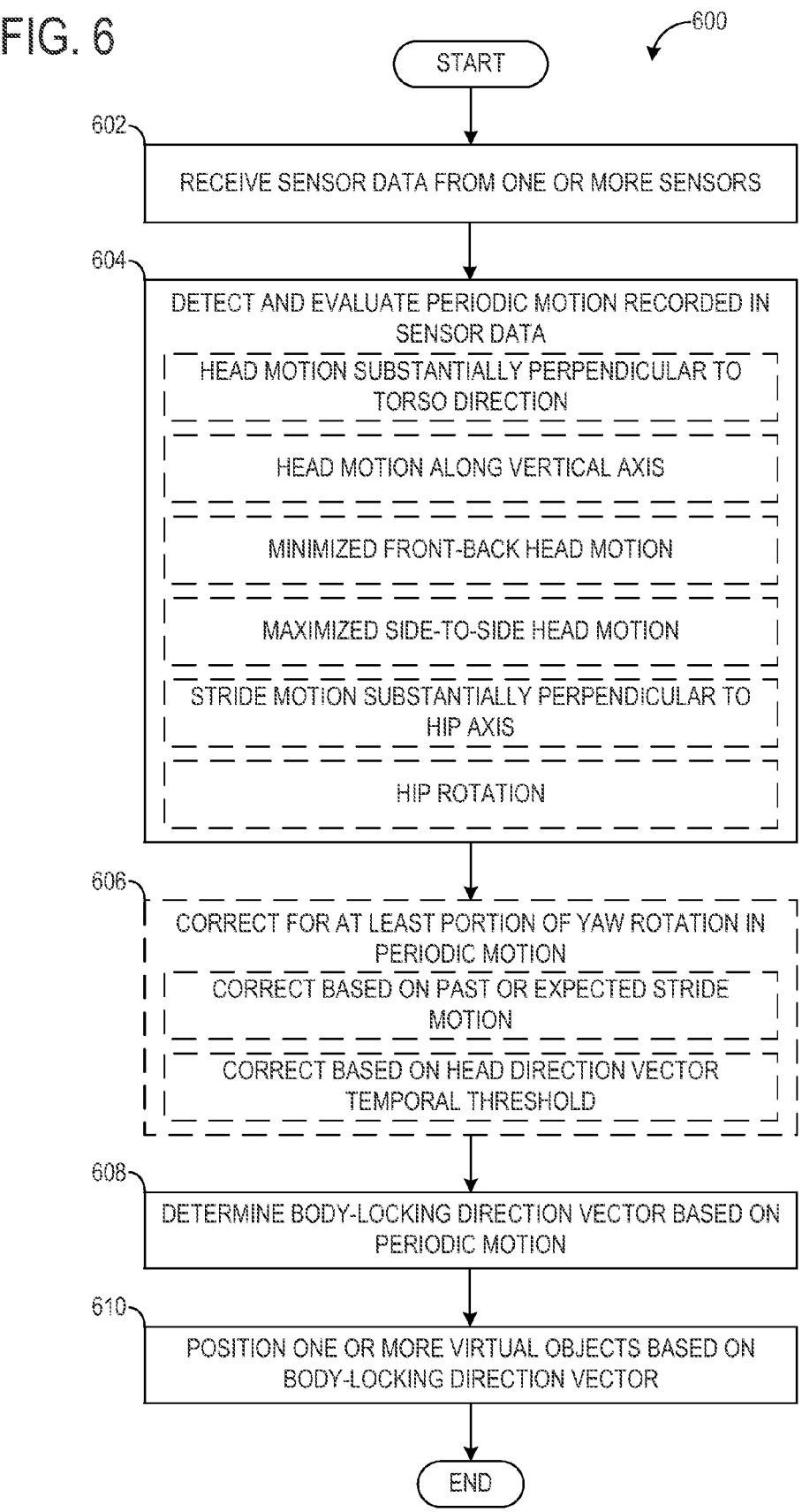
FIG. 6 shows a flow diagram depicting an embodiment of a method of positioning body-locked virtual objects in an augmented reality environment based on the detection and evaluation of periodic motion.

FIG. 6 shows a flow diagram depicting an embodiment of a method 600 of positioning body-locked virtual objects in an augmented reality environment based on the detection and evaluation of periodic motion from one or more sensors.

Figure 7A:
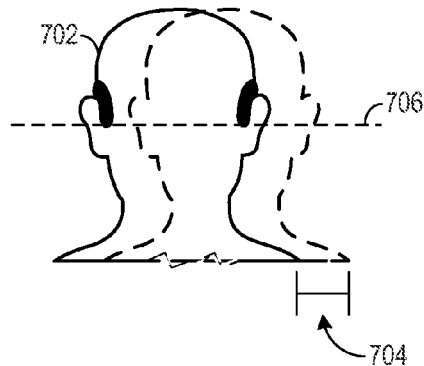
FIGS. 7A-D illustrate examples of periodic motion which may be detected and evaluated by the method of FIG. 6.

Method 600 comprises, at 602, receiving sensor data from one or more sensors, and at 604, detecting and evaluating periodic motion recorded in the sensor data received. Various types of periodic motion may be detected and evaluated. As a first non-limiting example, periodic motion corresponding to a head of the user in a direction substantially perpendicular to a body direction may be detected and evaluated. FIG. 7A shows an example of such periodic motion which may be detected and evaluated by method 600. As the user undergoes motion, a head 702 of the user may periodically oscillate in a side-to-side manner (e.g., in a left-to-right direction substantially along a horizontal axis). A magnitude of this oscillation is shown in FIG. 7A at 704. As a maximum in such side-to-side oscillation may occur in a direction substantially perpendicular to a direction in which the user is walking, a determined direction for this maximum (shown by horizontal axis 706) may be used to determine the estimated body direction of the user and thus to set a BLDV.

Figure 7B:
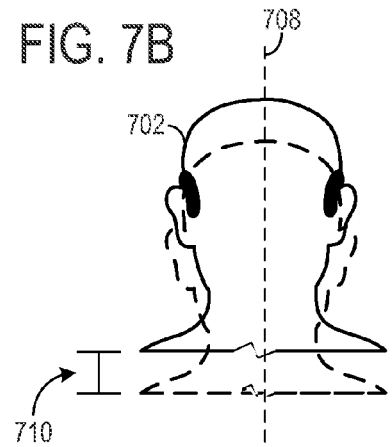

Periodic head motion along a vertical axis also may be detected and evaluated. FIG. 7B shows how head 702 of the user may periodically oscillate in an up-and-down manner along a vertical axis 708, the distance of such oscillation represented by a vertical distance 710. Detection of such oscillation along vertical axis 708 may indicate that the user is walking, running, or the like. In the instance of such motion, a current HDV may be evaluated and assigned to the BLDV.

Further, periodic motion recorded in sensor data may be detected and evaluated to determine an average head position of a user over a selected duration of time. For example, the average head position may be a weighted average such that head positions determined based on sensor data at certain times (e.g., times corresponding to minimal head motion) may be weighted higher than those at other times (e.g., times corresponding to significant head motion). A BLDV may be then determined based on the weighted average of the user's head position over the selected duration.

In yet other embodiments, other analyses of periodic head motion may be performed. For example, analysis may be performed to determine a direction of periodic head motion that minimizes the motion of the head along a forward-to-backward direction, as this direction may be assumed to correspond to a direction in which the user is walking (due to periodic motion from walking being greatest in a side-to-side direction). The determined direction may then be assigned to the BLDV.

In some embodiments, additional sensor data may be received from secondary device sensors in a computing device worn, held by, or otherwise attached to a user at a location other than the head. As one non-limiting example, a smartphone may be carried in a user front pants pocket. A compass and IMU included in the smartphone may be used to determine the orientation of the smartphone. An estimated direction of the body of the user may thus be determined based on the smartphone orientation.

In other scenarios, additional periodic motion data may be received from one or more sensors included in a secondary, separate device held in a pants pocket of the user. The following examples of periodic motion will be described with reference to such a scenario, though it will be appreciated that the method may apply to other devices positioned in other locations relative to a user's body.

Figure 7C:
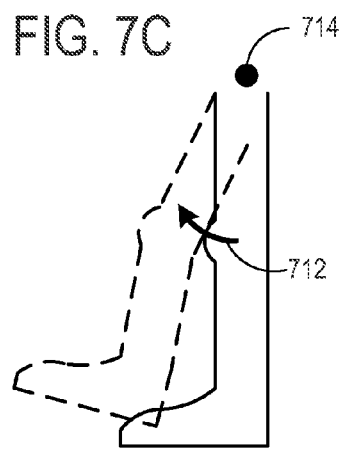

In one example approach, sensor data recorded by an accelerometer of a smartphone or other secondary device may be evaluated, as indicated at 604, to determine a direction in which a user is undergoing translational motion. If the user is walking, a leg of the user may periodically move in a forward-backward direction. This motion may be detected in data from a sensor of the smart phone to find a primary direction of motion. The primary direction may then be assigned to the BLDV. FIG. 7C illustrates a stride arrow 712 representing a direction in which the leg of the user may undergo motion, wherein the primary axis may correspond substantially to stride arrow 712. Such an approach may facilitate determination of a BLDV without knowledge of the orientation of the smartphone.

In another approach, sensor data recorded by a gyroscope of a smartphone in a pocket of a user may be evaluated to determine a direction of translational user motion. As the user walks, a leg of the user may be periodically rotating about a hip joint and a hip axis extending between the user's hip joints. Thus, the sensor data from the gyroscope may be evaluated to determine the hip axis, and the BLDV may be determined as a vector substantially perpendicular to the hip axis. FIG. 7C shows an example of a hip axis 714 about which a leg and/or hip of the user may rotate during translational motion.

Continuing, method 600 further may comprise, at 606, correcting for at least a portion of yaw rotation in a sensor signal from a separate device. Yaw rotation in the context of a smartphone or other device carried in a pants pocket may correspond to user rotation about a vertical axis (e.g., an axis extending head-to-toe). It will be understood that yaw rotation data corresponding to a change in user direction may be useful for determining a BLDV, while other types of yaw rotation data, for example corresponding for example to periodic hip swing during walking, may be comparatively less useful in determining a BLDV.

Figure 7D:
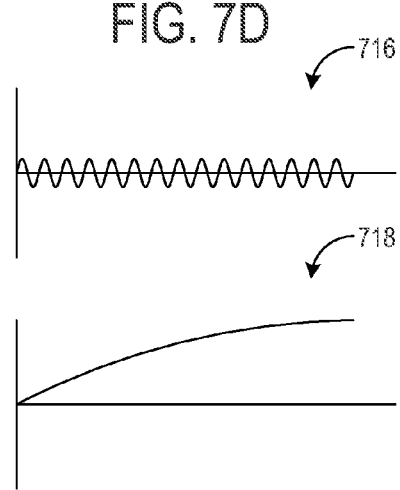

FIG. 7D shows two graphs that illustrate different types of yaw motion, wherein the vertical axis represents radial distance from a reference direction (e.g. user body direction at time zero), and the horizontal axis represents time. Periodic yaw motion arising from hip swing as a function of time may appear as shown at 716, whereas yaw motion corresponding to a change in user body orientation may appear as shown at 718. Thus, correcting a total yaw rotational signal for periodic motion in yaw data may allow recovery of the data shown at 718, which may be used to determine an indication of body orientation, and thus to determine a BLDV.

Further, the periodic component of yaw rotational data also may be used to determine a BLDV. For example, the leg speed of a user may vary as a function of its position in a stride, as the leg may achieve its maximum speed during the middle of a stride and minimum speeds at starting and ending points of a stride. As the direction of movement in the middle of the stride may correspond to a direction in which the user is walking, periodic yaw motion may be evaluated to determine a location in the stride at which the stride speed is at a maximum. A direction of motion at this location then may be used to determine a BLDV.

It will be appreciated that correction of periodic motion for hip swing yaw rotation may be performed in any suitable manner, including but not limited to arithmetic methods. Further, in some embodiments, a period-to-frequency transform (e.g., Fourier transform) may be performed on periodic yaw rotation data to determine one or more characteristic frequencies, which may then be removed from the overall sensor data.

Continuing with FIG. 6, method 600 comprises, at 608, determining a BLDV based on the periodic motion. This may be performed in any suitable manner, including but not limited to any one or more of the above-described manners. Further, at 610, method 600 comprises positioning one or more virtual objects based on the BLDV determined.

In some embodiments, a temporal threshold may be used to help maintain a BLDV during periods of user inactivity. For example, if a user does not perform any translational or rotational movements outside of a defined range within a threshold time, then the BLDV may be locked to an average HDV over time to prevent drift of the BLDV until significant motion again occurs.

In some embodiments, the methods and processes described above may be tied to a computing system of one or more computing devices. In particular, such methods and processes may be implemented as a computer-application program or service, an application-programming interface (API), a library, and/or other computer-program product.

Figure 8:
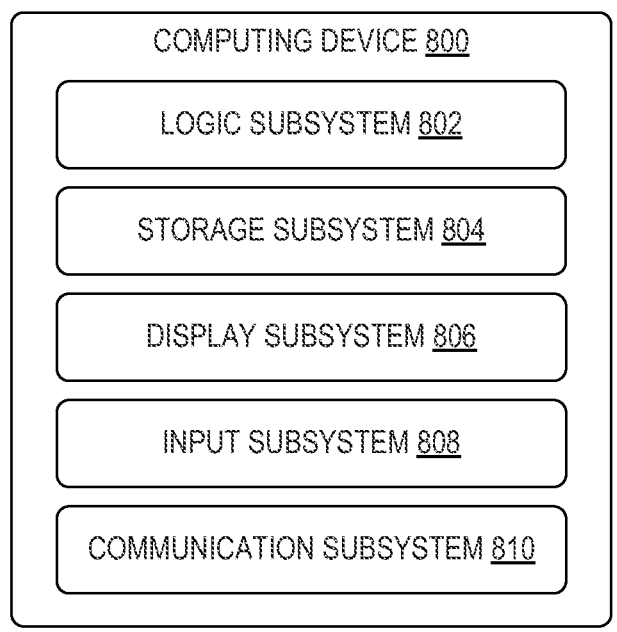
FIG. 8 shows a block diagram of an embodiment of a computing device in accordance with the present disclosure.

FIG. 8 schematically shows a non-limiting embodiment of a computing system 800 that can enact one or more of the methods and processes described above. Computing system 800 is shown in simplified form. It will be understood that virtually any computer architecture may be used without departing from the scope of this disclosure. In different embodiments, computing system 800 may take the form of a mainframe computer, server computer, desktop computer, laptop computer, tablet computer, home-entertainment computer, network computing device, gaming device, mobile computing device, mobile communication device (e.g., smart phone), head mounted display, etc.

Computing system 800 includes a logic subsystem 802 and a storage subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 804 includes one or more physical devices configured to hold data and/or instructions executable by the logic subsystem to implement the methods and processes described herein. When such methods and processes are implemented, the state of storage subsystem 804 may be transformed—e.g., to hold different data.

Storage subsystem 804 may include removable media and/or built-in devices. Storage subsystem 804 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices and excludes propagating signals per se. In some embodiments, aspects of the instructions described herein may be propagated as a pure signal (e.g., an electromagnetic signal, an optical signal, etc.) via a transmission medium, as opposed to a storage device. Furthermore, data and/or other forms of information pertaining to the present disclosure may be propagated by a pure signal.

In some embodiments, aspects of logic subsystem 802 and of storage subsystem 804 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 800 implemented to perform a particular function. In some cases, a module, program, or engine may be instantiated via logic subsystem 802 executing instructions held by storage subsystem 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage subsystem 804. This visual representation may take the form of a graphical user interface (GUI). As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

In some embodiments, display subsystem 806 may comprise a see-through display system configured to provide for the presentation of augmented reality experiences by allowing virtual objects to be displayed over a real-world background. Such a see-through display subsystem may comprise projection optics, waveguides incorporated into lenses of the see-through display, and/or any other suitable optics to deliver images from a microdisplay to a user's eye(s).

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a head-mounted display device, a method of positioning a virtual object, the method comprising:
    receiving sensor data comprising one or more of motion data, location data, and orientation data from one or more sensors located on the head-mounted display device;
    based upon the sensor data, determining a body locking vector based upon an estimated direction in which a body of a user is facing;
    positioning the virtual object based on the body locking vector;
    receiving additional sensor data;
    based upon the additional sensor data, determining a last significant motion vector;
    determining a head direction vector;
    determining an angle between the last significant motion vector and the head direction vector;
    comparing the angle between the last significant motion vector and the head direction vector to a rotational motion threshold; and
    updating the body-locking direction vector upon meeting the rotational motion threshold.

2. The method of claim 1, further comprising repositioning the virtual object based on the updated body-locking direction vector.

3. The method of claim 1, wherein the rotational motion threshold corresponds to a rotational orientation of a head of the user.

4. The method of claim 1, wherein determining the estimated direction in which the body of the user is facing comprises determining and evaluating periodic motion.

5. The method of claim 4, wherein detecting the periodic motion comprises detecting the periodic motion based upon evaluation of the sensor data received from the one or more sensors located on the head-mounted display device.

6. The method of claim 4, wherein detecting the periodic motion comprises detecting the periodic motion based upon evaluation of the sensor data received from the one or more sensors located on the head-mounted display device and upon evaluation of additional sensor data received from one or more secondary device sensors.

7. The method of claim 1, further comprising determining a confidence score of a speech input based upon an angle between a head direction vector and the body-locking direction vector, and utilizing the confidence score in determining whether to perform the speech input, the head direction vector determined based upon the sensor data and an estimated direction in which a head of the user is facing.

8. A head-mounted display device, comprising:
    a logic subsystem;
    a see-through display; and
    a storage subsystem comprising instructions executable by the logic subsystem to position one or more virtual objects in a field of view of a user by:
        receiving motion data from one or more motion sensors located on the head-mounted display device;
        based upon the motion data, determining
        a head direction vector,
        a body-locking direction vector based upon an estimated direction in which a body of the user is facing, and
        a last significant motion vector based upon an estimated direction of user motion;
        determining, at each of one or more update intervals, an angle between the last significant motion vector and the head direction vector;
        if the angle meets a threshold condition, then not changing the body-locking direction vector;
        if the angle does not meet the threshold condition, then changing the body-locking direction vector based upon the last significant motion vector; and
        displaying the one or more virtual objects on the see-through display at a location based on the body-locking direction vector.

9. The head-mounted display device of claim 8, further comprising:
    comparing the received motion data to a motion threshold;
    updating the body-locking direction vector upon meeting the motion threshold; and
    repositioning the one or more virtual objects based on the updated body-locking direction vector.

10. The head-mounted display device of claim 8, wherein assigning at least the portion of the last significant motion vector to the body-locking direction vector includes interpolating between the last significant motion vector and the body-locking direction vector.

11. The head-mounted display device of claim 8, further comprising updating the last significant motion vector upon meeting a translational threshold.

12. On a head-mounted display device, a method of positioning one or more virtual objects, the method comprising:
   receiving motion data from one or more motion sensors, the one or more motion sensors comprising one or more motion sensors located on the head-mounted display device;
   determining a body-locking direction vector based upon detection and evaluation of periodic motion signals recorded in the motion data; and
   positioning the one or more virtual objects on a see-through display based on the body-locking direction vector;
   receiving additional motion data;
   determining a last significant motion vector based upon the motion data;
   determining a head direction vector;
   determining an angle between the last significant motion vector and the head direction vector;
   comparing the angle between the last significant motion vector and the head direction vector to a rotational motion threshold; and
   updating the body-locking direction vector upon meeting the rotational motion threshold.

13. The method of claim 12, wherein the periodic motion corresponds to motion of a head of a user along an axis substantially perpendicular to the estimated direction in which the body of the user is facing.

14. The method of claim 12, wherein the periodic motion corresponds to motion of a head of a user along a vertical axis, and further comprising determining a head direction vector from the motion data and determining the body-locking direction vector based upon the head direction vector when the user is determined to be in motion based upon the periodic motion.

15. The method of claim 12, wherein the periodic motion corresponds to one or both of stride motion in a direction substantially perpendicular to a hip axis of a user, and rotation of the hip of the user.

16. The method of claim 12, wherein evaluating the periodic motion signals recorded in the motion data includes determining a weighted average of a head position of a user over a selected duration.

17. The method of claim 12, further comprising correcting for at least a portion of yaw rotation in the periodic motion.

* * * * *